(No Model.)
O. M. SWEET.
PIPE COUPLING.
No. 494,284. Patented Mar. 28, 1893.
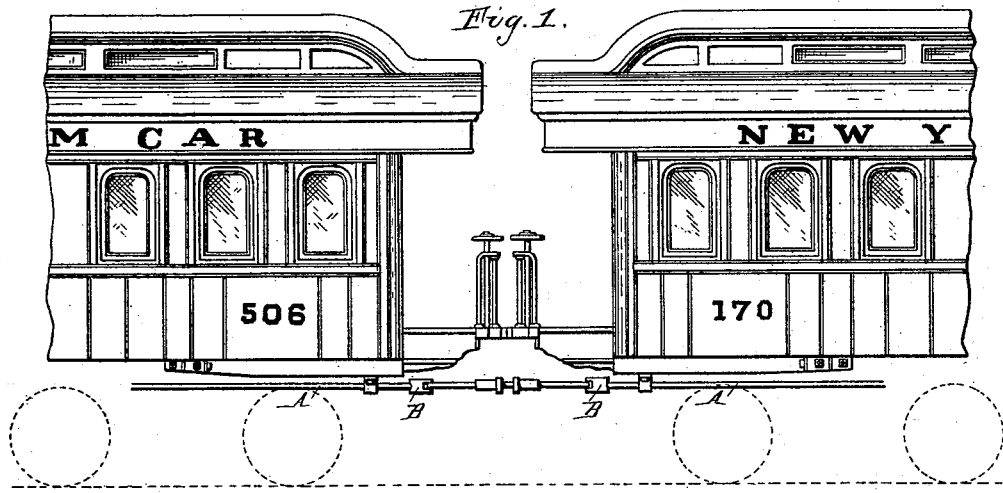
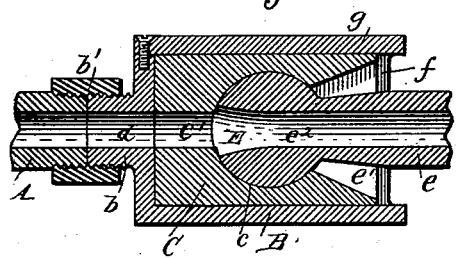
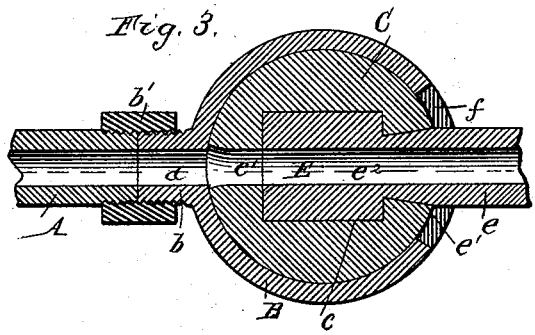
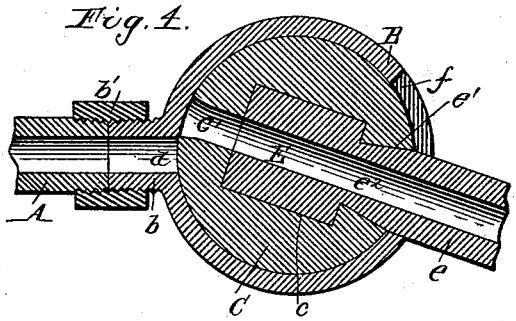
Witnesses:
Emil Neuhart.
Friedrich, Gustav, Wilhelm
O. M. Sweet
Inventor.
By Wilhelm Bonner
Attorneys.

UNITED STATES PATENT OFFICE.

ORANGE M. SWEET, OF SILVER CREEK, NEW YORK, ASSIGNOR OF ONE-HALF TO JOHN B. WEBSTER, OF SAME PLACE.

PIPE-COUPLING.

SPECIFICATION forming part of Letters Patent No. 494,284, dated March 28, 1893.

Application filed October 5, 1891. Serial No. 407,747. (No model.)

*To all whom it may concern:*

Be it known that I, ORANGE M. SWEET, a citizen of the United States, residing at Silver Creek, in the county of Chautauqua and State of New York, have invented new and useful Improvements in Pipe-Couplings, of which the following is a specification.

This invention relates to the couplings which are employed for connecting the steam pipes of adjoining railway cars and more especially to couplings of this character which are composed of jointed parts which are attached to the rigid steam pipes and accommodate themselves to the motions of the cars.

My invention has for its objects to produce a simple coupling in which the parts are easily fitted and to so construct the coupling that the escape of steam from the heating pipes is automatically shut off in case the coupling is parted by an accident to the train.

In the accompanying drawings:—Figure 1 is a fragmentary side elevation of two adjoining cars provided with my improved coupling. Fig. 2 is a vertical section, on an enlarged scale, of the swiveling portion of the coupling, showing the parts in a normal position in which the steam or other heating medium is allowed to pass through the coupling. Fig. 3 is a horizontal section thereof. Fig. 4 is a horizontal section, showing the parts in an abnormal position, in which the passage of the heating agent through the coupling is shut off.

Like letters of reference refer to like parts in the several figures.

A A are the steam pipes of the connected cars. Each of these pipes carries a pipe coupling composed of a swiveling portion which follows the vibrations and oscillations of the cars, and a sliding or extensible portion which permits the parts of the coupling to follow the motions of the cars as they approach and recede.

B is a shallow cylindrical casing or chamber provided at its inner end with a screw threaded stem or nozzle $b$ which is attached to the end of the steam pipe by an internally threaded sleeve $b'$, or otherwise.

C is a cylindrical block or knuckle fitted snugly in the cylindrical chamber B and capable of partially rotating therein. The block is provided with an internal cylindrical cavity or socket $c$, the axis of which lies in a plane at right angles or nearly so to that of the block.

$c'$ is a steam passage extending from the socket $c$ rearwardly through the block and adapted to coincide with a similar passage $d$ formed in the rear wall of the casing B and extending through the stem $b$.

E is a cylindrical knuckle or block arranged in the correspondingly shaped socket of the block C and capable of turning or oscillating therein to a limited extent.

$e$ is a pipe or stem arranged on the knuckle E, preferably integrally therewith and extending outwardly through a vertical slot or opening $e'$ formed in the outer side of the block C and an opening $f$ formed in the front side of the casing B. The vertical slot $e'$, is flared, as shown in Fig. 2, to permit of the requisite vertical play of the pipe or stem $e$ and the opening in the casing is made of sufficient size to permit of the required vertical and longitudinal play of the pipe. The knuckle E is provided with a transverse steam passage $e^2$ which forms a continuation of the passage of the pipe or stem $e$ and is adapted to register with the steam passage $c'$ of the block C so as to permit the steam to pass from the main steam pipe A to the pipe $e$ through the swiveling coupling.

The stationary pipe A of each car is provided with a coupling of the construction above described, and the pipes $e$ of the opposing couplings are detachably connected together by a pipe or tube, as shown in Fig. 1, a telescopic or sliding connection being preferably employed for this purpose.

When the cars are coupled together, the stems or pipes $e$ are in a horizontal position and the parts of the coupling occupy the position illustrated in Fig. 3, in which the steam passages of the casing B, block C, and knuckle E coincide, allowing the steam to pass from one car to the other. The horizontally oscillating block gives the connection between the swiveling coupling the necessary freedom of movement to follow the swaying movements of the car, while the knuckle E permits of the necessary vertical movement of the connections to enable them to accommodate themselves to the up and down motions of the cars. The rear ends of the steam passages in the block and knuckle are flared or enlarged as shown, so as not to restrict or cut off any of the passages by the slight displacement of the parts incident to the ordinary motions of the cars.

In the event of the cars being derailed or otherwise unusually displaced laterally, the block C is caused to turn in the casing beyond its ordinary limit, as shown in Fig. 4, thereby breaking the coincidence between the steam passages of the block and the casing and automatically checking the further passage of steam through the swiveling coupling and preventing its escape. When the passages are thrown out of register, their adjacent ends are covered by the tight portions of the casing, as shown in Fig. 4.

In case the connections between the swiveling couplings of two cars become separated by an accident or otherwise, the stems or pipes e drop by gravity, thereby breaking the coincidence of the steam passages of the knuckle and block and shutting off the steam.

The block C is introduced into the casing through the top of the latter which is closed by a removable cover g. The block is divided into two parts, preferably in a plane at right angles to the axis of the cylindrical knuckle E to permit the latter to be inserted in the socket of the block.

My improved coupling is simple in construction and reliable in operation, and as its parts are free from spherical surfaces, the same are more easily constructed and fitted and packed than a spherical or ball and socket joint, thus correspondingly reducing the cost of the coupling.

I claim as my invention—

1. In a pipe coupling, the combination with a cylindrical casing having a port or passage, of a cylindrical block capable of turning in said casing and having a passage adapted to register with the port of the casing and an internal cylindrical socket and a cylindrical knuckle fitted in the socket of the block and having a passage adapted to coincide with the passage of the block, substantially as set forth.

2. In a pipe coupling, the combination with a cylindrical casing having a port or passage in its rear side and an opening in its front side, of a cylindrical block arranged to turn in said casing and having an internal cylindrical socket, a passage leading from said socket to the periphery of the block, and in its front side a vertical slot, and a cylindrical knuckle fitted in the socket in the block and having a passage adapted to register with the passage of the block, and a stem or pipe extending through the slot of the block and the opening in the front side of the casing, substantially as set forth.

Witness my hand this 18th day of September, 1891.

ORANGE M. SWEET.

Witnesses:
J. B. MARTIN,
H. P. BISHOP.